United States Patent [19]

Simon et al.

[11] 4,097,658
[45] Jun. 27, 1978

[54] PROCESS FOR PREPARING COPOLYMERS OF ELASTOMERIC PROPERTIES FROM OLEFINIC MONOMERS

[75] Inventors: Artur Simon; Gyula Sárosi; Balázs Keszler; Attila Tóth; Mária Réthy, all of Budapest, Hungary

[73] Assignee: Muanyagipari Kutato Intezet, Budapest, Hungary

[21] Appl. No.: 714,655

[22] Filed: Aug. 16, 1976

[30] Foreign Application Priority Data

Aug. 19, 1975 Hungary .............................. MU 542

[51] Int. Cl.$^2$ ............................................... C08F 4/16
[52] U.S. Cl. .................................... 526/143; 526/339
[58] Field of Search ................ 526/144, 339, 143, 135

[56] References Cited

U.S. PATENT DOCUMENTS

| | | | |
|---|---|---|---|
| 3,808,177 | 4/1974 | Thaler | 526/339 |
| 3,850,897 | 11/1974 | Priola | 526/144 |

FOREIGN PATENT DOCUMENTS 1,327,664   8/1973   United Kingdom.

*Primary Examiner*—Paul R. Michl
*Attorney, Agent, or Firm*—Young & Thompson

[57] ABSTRACT

Copolymers having elastomeric properties are prepared by the polymerization of olefinic monomers with catalysts of modified Ziegler-Natta type, wherein a mixture of isobutylene and butadiene is used as olefinic monomer.

The process renders possible the preparation of elastomeric copolymers from cheap raw materials, such as the $C_4$-fraction formed by the pyrolysis of gasoline.

2 Claims, No Drawings

PROCESS FOR PREPARING COPOLYMERS OF ELASTOMERIC PROPERTIES FROM OLEFINIC MONOMERS

The invention relates to a process for preparing copolymers of elastomeric properties by the polymerization of olefinic monomers with catalysts of Ziegler-Natta type mofified by phosgene or by phosgene derivatives, in a medium of hydrocarbons or chlorinated hydrocarbons, followed by the precipitation of the obtained polymer with a $C_{1-5}$ alcohol containing an antiageing agent.

It is known that copolymers having elastomeric properties can be prepared from monoolefins and conjugated diolefins. Further, it is known that an elastomer of this type is the copolymer which can be prepared from propylene and butadiene by means of a Ziegler-Natta catalyst modified by phosgene (British patent specification No. 1,327,664). It is also known that by the polymerization of a mixture of isobutylene and butadiene in the presence of a catalyst of coordinative anionic type, a mixture of polyisobutylene and polybutadiene homopolymers is obtained (J. Polymer Sci. A 9, 3415 /1971/). Lastly, it is known that the polymerization of a mixture of butadiene and isobutylene with a Friedl-Crafts type catalyst affords a copolymer which contains not more than 15.6 mole % of butadiene (J. P. Kennedy and E. G. N. Tornquist: "Polymer Chemistry of Synthetic Elastomers," Part I, p. 322, Interscience Publishers, 1968). However, no data are given for properties (molecular weight, degree of unsaturation) of this copolymer. On the basis of the composition data it can be inferred that both above-mentioned parameters have low values, and thus the obtained copolymer cannot possess elastomeric properties.

The methods known so far have the common drawback that artificial mixtures of pure monomers are used as starting materials, and thus they do not render possible the use of cheap raw materials, such as those obtained by the pyrolysis of gasoline mixtures, without any separation.

The aim of the invention is the production of copolymers having elastomeric properties from cheap raw materials, such as the $C_4$-fraction formed by the pyrolysis of gasoline.

A further aim of the invention is the preparation of a copolymer having an unsaturation of such a degree and such a position that it can be cross-linked by the conventional vulcanisation process, and having further such a molecular weight that the mechanical properties of the cross-linked product correspond to the values of materials used as elastomers.

The invention is based on the recognition that the above-specified aims can be attained when the monoolefinic component of the copolymer or the major part of this component carries two methyl side-groups and both methyl groups are linked to the same carbon atom. Thus, the crystallization of the copolymer can be avoided better than in the case of many other monoolefine-diolefine copolymers, e.g. of the propylene-butadiene copolymer. Namely, it is generally known that the propylene homopolymer and its copolymers are very inclined to form crystalline structures.

The invention is based further on the recognition that copolymers having elastomeric properties can be prepared from butadiene and isobutylene and/or n-butanes and optionally from saturated hydrocarbons by using suitable proportions of the components and using the in itself known catalyst system of phosgene-aluminium alkyl-$TiCl_4$.

Lastly, the invention is based on the recognition that the polymerization of olefinic monomers can be carried out even in the presence of saturated hydrocarbons, and thus also the $C_4$-fraction obtained by the pyrolysis of gasoline can be used as a starting material of polymerization.

On the basis of the above the invention is a process for preparing copolymers of elastomeric properties by the polymerization of olefinic monomers with catalysts of Ziegler-Natta type modified by phosgene or phosgene derivatives, in a medium of hydrocarbons or chlorinated hydrocarbons, followed by the precipitation of the obtained polymer with a $C_{1-5}$ alcohol containing an antiageing agent, characterized in that a mixture of isobutylene and butadiene containing from 30 to 95 % of butadiene is used as olefinic monomer, the said mixture containing, if desired, at most 20 % by weight of butene-1 and/or butene-2, related to the total amount of monomers.

The catalyst can be decomposed, prior to precipitating the polymer, by the addition of 5-25 ml, preferably 15 to 20 ml of a $C_{1-5}$ alcohol, preferably methanol, related to 1 g of $TiCl_4$ present in the applied catalyst, the added alcohol containing an antiageing agent. 1 to 60 % by weight of a filler, preferably carbon black or aerosil, related to the polymer, can be added to the solution of the polymer.

In conformity with an advantageous embodiment of the process according to the invention the $C_4$-fraction obtained by the pyrolysis of gasoline and containing at least 30 % of butadiene, is used as olefinic monomer.

The main advantages offered by the process according to the invention are as follows:

(a) In an unloaded state the polymer consists of molecules of a completely amorphous structure though of a linear type, and these molecules have, when vulcanized and stretched, a rubber-like arrangement.

(b) With respect to the number of double bonds present in the copolymer and to their position, the copolymer can be vulcanized in a way conventional in the rubber industry, e.g. by means of sulphur.

(c) Practically no gel formation takes place during the preparation of the copolymer, quite in contrast to a number of processes for the preparation of synthetic rubbers where appreciable difficulties are encountered due to the occurrence of gel formation.

(d) The precipitation and the further treatment of the copolymer becomes very easy when a suitable filler is mixed with the solution prior to the precipitation of the copolymer.

(e) It is possible to use the $C_4$-fraction formed by the pyrolysis of gasoline as starting material without any further separation or purification step.

The process according to the invention is further illustrated by the aid of the following Examples.

EXAMPLE 1

Into a 180 ml pressure-tight metal vessel filled with nitrogen 50 ml of trichloroethylene are weighed at 20° C. Then, under stirring, 7 ml of a 0.5 M solution of triethyl aluminium in cyclohexane and 0.57 ml of a 0.77 M solution of phosgene in trichloroethylene are added. After allowing the mixture to stand for 10 minutes, 5 ml of a 0.7 M solution of $TiCl_4$ in cyclohexane and 30 g of a monomer mixture consisting of 80 % of butadiene and 20 % of isobutylene are added at 20° C. Subsequently, the vessel is thermostated at 40° C under continuous stirring for 4 hours, then the residual monomers are blown off, and the polymer is precipitated from the solution by adding methanol of a 15-fold volume, referred to the reaction mixture, and containing 0.1 g of phenyl-β-naphthylamine. The precipitated polymer is separated from the mother liquor, then washed with methanol and dried in vacuo at 40° C. The amount of the obtained polymer is 10 g; its intrinsic viscosity measured in toluene at 30° C is 1 and its degree of unsaturation determined according to Wijs amounts to 390 g $I_2$/100 g of polymer.

EXAMPLE 2

One proceeds as described in Example 1, with the difference that 30 g of a monomer mixture composed of 12 g of butadiene, 8 g of isobutylene, 5 g of butene-1 and 5 g of butene-2 is used, and instead of trichloroethylene an identical volume of tetrachloroethylene is applied. The amount of the obtained polymer is 8.5 g; its intrinsic viscosity measured in toluene at 30° C is 0.79, and its degree of unsaturation determined according to Wijs is 340 g $I_2$/100 g of polymer.

EXAMPLE 3

One proceeds as described in Example 1, with the difference that 30 g of the $C_4$-fraction obtained in the pyrolysis of gasoline is applied as monomer mixture with the following composition:

| isobutylene | 17.2 % by weight |
|---|---|
| butadiene | 40.4 % by weight |
| trans-butene-2 | 17.4 % by weight |
| cis-butene-2 | 8.5 % by weight |
| butene-1 | 5.0 % by weight |
| saturated $C_3$–$C_4$ hydrocarbons | 11.5 % by weight. |

The amount of the obtained polymer is 7.9 g, its intrinsic viscosity measured in toluene at 30° C is 0.8 and its degree of unsaturation determined according to Wijs is 330 g $I_2$/100 g of polymer.

EXAMPLE 4

One proceeds as described in Example 3, with the difference that instead of a phosgene solution 0.44 ml of a 1 M solution of acetyl chloride in trichloroethylene is applied. The amount of the obtained polymer is 5.0 g; its limit viscosity measured in toluene at 30° C is 0.48, and its degree of unsaturation determined according to Wijs amounts to 361 g of $I_2$/100 g of polymer.

EXAMPLE 5

One proceeds as described in Example 3, with the difference that instead of trichloroethylene an identical volume of toluene is applied. The amount of the obtained polymer is 6.5 g; its intrinsic viscosity measured in toluene at 30° C is 0.58, and its degree of unsaturation determined according to Wijs is 360 g $I_2$/100 g of polymer.

With the use of the polymer obtained in this way the following mixture is prepared at 20° C in a roll mill:

| copolymer | 20 g |
|---|---|
| ZnO | 1.0 g |
| stearic acid | 0.2 g |
| sulphur | 0.6 g |
| phenyl-β-naphthylene | 0.2 g |
| mercaptobenzthiazole | 0.3 g |
| Aerosil-300 ($SiO_2$) | 13.0 g |
| $TiO_2$ | 3.5 g |
| iron oxide red | 1.2 g. |

The mixture is put into a press for 40 minutes at 160° C. The characteristics of the rubber prepared in this way are as follows:

| tensile strength | 0.88 kg/mm² |
|---|---|
| maximum elongation | 399 % |
| permanent elongation | 15 % |
| Shore hardness | 74 |
| stress measured at 100 % elongation | 0.32 kg/mm² |
| stress measured at 200 % elongation | 0.55 kg/mm² |
| stress measured at 300 % elongation | 0.76 kg/mm². |

EXAMPLE 6

One proceeds in the way as described in Example 1, with the difference that prior to precipitation with methanol the polymer solution is treated with 2 ml of methanol containing 0.1 g of phenyl-β-naphthylamine, in order to decompose the catalyst. Subsequently, the precipitated residues of the catalyst are removed by filtration, then 50 per cent by weight of carbon black (related to the amount of polymer) is mixed up with the polymer solution. Then the copolymer is precipitated by adding, under stirring, methanol of a 15-fold volume, related to the mixture comprising the solvent, and containing an antiageing agent. The precipitated copolymer is separated from the mother liquor, washed with methanol and dried in vacuo at 40° C. The dried substance is slightly sticky and can be readily processed further e.g. by working up to a mixture of the following composition in a roll mill at 20° C:

| copolymer | 16 g |
|---|---|
| natural rubber | 4 g |
| carbon black (PN 75-MAF) | 10 g |
| stearic acid | 0.6 g |
| ZnO | 1.0 g |
| phenyl-β-naphthylamine | 0.2 g |
| sulphur | 1.0 g |
| mercaptobenzthiazole | 0.3 g. |

The above mixture is then put into a press for 40 minutes at 143° C. The rubber prepared in this way has the following characteristics:

| tensile strength | 0.92 kg/mm² |
|---|---|
| maximum elongation | 300 % |
| stress measured at 100 % elongation | 0.41 kg/mm² |
| permanent elongation | 10 % |
| Shore hardness | 77. |

What we claim is:

1. A process for preparing copolymers of elastomeric properties by the polymerization of olefinic monomers with catalysts of hiethyl aluminum and titanium tetrachloride modified by phosgene or acetyl chloride, in a medium of hydrocarbons or chlorinated hydrocarbons, followed by the prcipitation of the obtained polymer with a $C_{1-5}$ alcohol containing an antiageing agent, characterized by using as an olefinic monomer a mixture of isobutylene and butadiene in which the amount of butadiene is between 30% and 95%, the said mixture containing, if desired, at most 20% by weight of butene-1 and/or butene-2, related to the total amount of monomers.

2. A process as claimed in claim 1, characterized by using as olefinic monomer the $C_4$-fraction, containing at least 30% of butadiene, obtained by the pyrolysis of gasoline.

* * * * *